(Model.)
H. STRAIT.
POTATO DIGGER.
No. 252,538.  Patented Jan. 17, 1882.
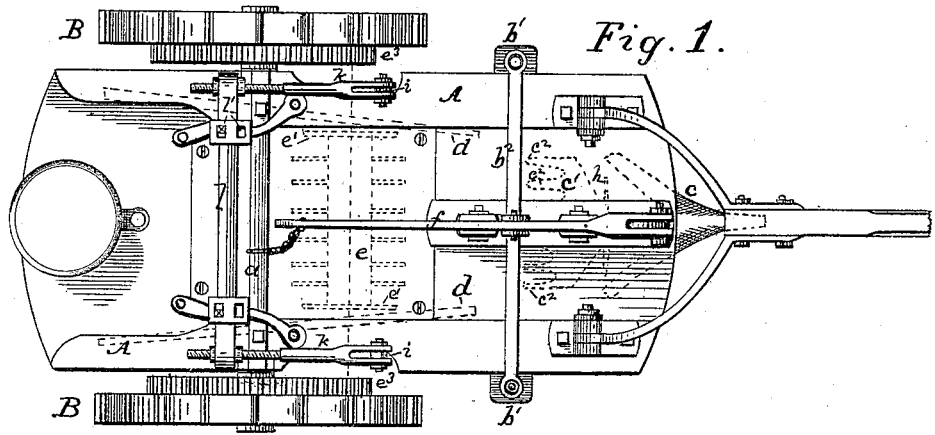
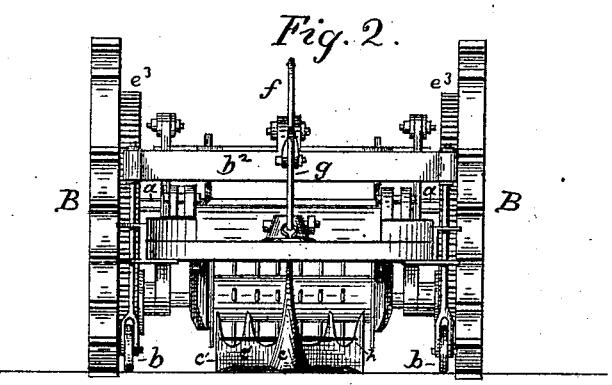
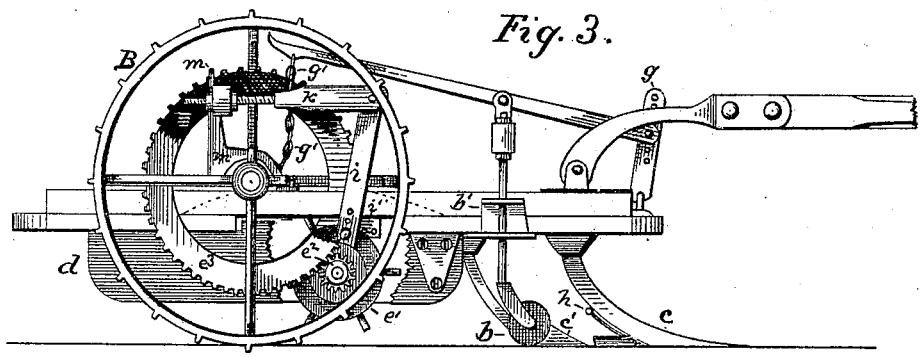
WITNESSES:
Thos. Houghton.
A. G. Lyne.
INVENTOR:
Hiram Strait
BY
ATTORNEYS.
N. PETERS. Photo-Lithographer. Washington. D. C.

UNITED STATES PATENT OFFICE.

HIRAM STRAIT, OF TROY, NEW YORK.

POTATO-DIGGER.

SPECIFICATION forming part of Letters Patent No. 252,538, dated January 17, 1882.

Application filed June 9, 1881. (Model.)

*To all whom it may concern:*

Be it known that I, HIRAM STRAIT, of Troy, in the county of Rensselaer and State of New York, have invented a new and useful Improvement in Potato-Diggers, of which the following is a full, clear, and exact description, reference being had to the drawings hereto annexed.

The present invention is an improvement upon a potato-digger described in Letters Patent No. 210,061, granted to me November 19, 1878, and which belongs to the class in which a share for opening the soil is used in combination with a rotating fingered cylinder, by which the potatoes are separated from the soil and thrown out upon the surface.

My improvement consists in certain important changes in the said invention and additions thereto, as more particularly hereinafter pointed out.

In the drawings forming part of this specification, Figure 1 is a plan view of the improved digger; Fig. 2, a front elevation; and Fig. 3 a side elevation, partially broken away.

The digger consists in a suitable frame, A, secured to a stationary axle, $a$, and supported upon two wheels, B, near the rear end thereof, and two vertically-adjustable casters, $b$, near the forward end, the forward share, $c$, for loosening the ground, the rear share, $c'$, for elevating the broken soil, the rearwardly-diverging side boards, $d$, the fingered cylinder $e$, and the regulating mechanism hereinafter described. The casters $b$ are provided with cylindrical shanks, which are loosely supported in guides or brackets $b'$, secured to opposite sides of the forward end of the frame and connected at their tops by a cross-bar, $b^2$. A lever, $f$, is pivoted between brackets on the upper side of this bar, and adjustably connected at its forward end to an upright bar, $g$, which is secured to the frame and provided with a number of perforations for varying the adjustment of said lever. The rear end of this lever is provided with a hook, which is to be inserted into any one of the links of chain $g'$, which is secured to the axle $a$, whereby the forward end of the frame may be held in a lowered or elevated position and the casters adjusted so as to support the said end in any desired position. By this arrangement when the forward end of the frame is elevated no additional weight is thrown upon the tongue, while the latter, which is pivoted to the upper portion of the frame, is allowed to oscillate, so as to adjust itself thereto.

The forward share, $c$, is a sharp-edged bar of triangular form having a central standard which is rigidly secured at any desired position in a suitable socket in the frame. A raised T-shaped extension, $h$, similar to that shown in my former invention is secured just behind the said standard in such manner that its horn-like extensions will reach to points a little above the rear extremities of the triangular share $c$. As thus constructed the arms of this share will pass beneath the potatoes, while the T-shaped extension will pass just above them and sever the vines therefrom, the ground at the same time being thoroughly loosened but not thrown open. The rear share, $c'$, is also of triangular shape, and provided with a central standard, which is secured to the frame in like manner at any desirable position behind the share $c$. This share is scoop-shaped, and provided at its rear upper portion with backwardly-inclined teeth $c^2$, through which the elevated soil and potatoes are made to pass, the object being more thoroughly to loosen and distribute the soil before the operation of raking out the potatoes is begun.

The fingered cylinder $e$, by which the potatoes are to be raked out of the soil, does not differ materially from the one employed in my former invention, above referred to. It is provided, however, with disks $e'$ at each end, to prevent the potatoes from being scattered to either side as they are raked out of the soil by the fingers, which are screwed into the cylinder. In my former invention the cylinder is geared with the drive-wheels in such manner that it will rotate forwardly in the same direction with the said wheels and rake the potatoes out at its rear; but this method is objectionable in some respects, and I adopt a different method, which consists in gearing the pinions $e^2$ on the extreme ends of the shaft which carries said cylinder with wheels $e^3$, which are secured to the inner sides of the spokes of the wheels B and provided with cogged peripheries for meshing with said pinions. By this means the cylinder $e$ is rotated backward instead of forward, and the potatoes are raked out of the soil and carried over the cylinder and deposited in the rear upon the surface of the ground.

The method of throwing this cylinder in and out of gear is quite similar to the one I have formerly used, but improved in certain respects.

The upright bars $i\ i$, in the lower ends of which the shaft of the cylinder is journaled, are adjustable both vertically and longitudinally by means of its own vertical series of perforations and the longitudinal series of perforations in the plates $i'\ i'$, which are secured in the sides of the frame. The upper ends of bars $i\ i$ are connected respectively to two toggle-jointed levers, $k\ k$, which are provided with screw-threaded ends, and connected by means of a cross-bar, $l$, which is adjusted in position and held by nuts. This cross-bar is provided with two forward and two rear apertures or loops, $l'$, near the ends thereof, which are made to fit over or receive two tapering uprights, $m\ m$, which are secured to the top of the frame near the axle. By pressing the cross-bar $l$ forward the pinions $e^2$ are thrown backward into gear with the wheels $e^3$, and then by pressing the said cross-bar down the uprights $m\ m$ will enter the rear apertures of said bar and the pinions be thus held in gear. By drawing the bar backward the pinions are thrown out of gear and held in that position by engaging the forward apertures of the bar with the uprights. As this cross-bar and the lever $f$ are within reach of the driver while occupying the seat the entire regulating mechanism may be easily manipulated without stopping the machine.

On opposite sides of the cylinder is a side board, $d$, to prevent the potatoes from being scattered to either side, the forward ends of which extend slightly in advance of the fingers of the cylinder and the rear ends which diverge apart to the rear of the frame. These boards are designed to extend nearly to the ground, and the fingers of the cylinder project sufficiently below them to reach the potatoes that are deepest in the ground. These boards are recessed at the sides to receive the shaft of the cylinder and admit of its vertical adjustment. To accommodate the fingered cylinder the frame is recessed above it, and the recess thus formed covered over by a curved sheet-metal plate.

Having thus described my invention, what I claim as new, and desire to secure by Letters Patent, is—

1. In a potato-digger, the combination, with frame A, supported upon wheels B and casters $b$, of the forward share, $c$, having a central standard and T-shaped extension, $h$, arranged with its points above the extremities of said share, and rear share, $c'$, made scoop-shaped for elevating the broken soil, and provided with rearwardly-inclined teeth $c^2$, substantially as shown and described.

2. In a potato-digger, the combination of frame A, fingered cylinder $e$, having disks $e'$, rearwardly-diverging side boards, $d$, wheels B, cog-wheels $e^3$, pinions $e^2$, uprights $i\ i$, perforated plates $i'\ i'$, toggle-jointed levers $k\ k$, cross-bar $l$, having loops $l'$, and tapering uprights $m\ m$, substantially as shown and described.

HIRAM STRAIT.

Witnesses:
A. W. HARRINGTON, Jr.,
EZRA R. VAIL.